United States Patent [19]  [11] 3,764,588
Arrighetti et al.  [45] Oct. 9, 1973

[54] CURABLE AMORPHOUS OLEFINIC TERPOLYMERS OBTAINED FROM ALPHA-OLEFINS AND POLYENES CONTAINING TWO CONJUGATED DOUBLE BONDS AND PROCESS FOR OBTAINING SAME

[75] Inventors: Sergio Arrighetti, Milan; Arnaldo Roggero, San Donato Milanese; Eugenio Vajna, San Donato Milanese; Sebastiano Cesca, San Donato Milanese, all of Italy

[73] Assignee: Snam Progetti, S.p.A., Milan, Italy

[22] Filed: Jan. 22, 1971

[21] Appl. No.: 109,033

[30] Foreign Application Priority Data
Jan. 22, 1970 Italy ............................... 19653 A/70
Jan. 22, 1970 Italy ............................... 19655 Z/70

[52] U.S. Cl. ...... 260/80.7, 260/80.78, 260/666 PY, 260/79.5 C
[51] Int. Cl. ............................................ C08f 15/40
[58] Field of Search ...................... 260/80.7, 80.78, 260/666 PY

[56] References Cited
UNITED STATES PATENTS
3,453,247 7/1969 Sartori ............................... 260/79.5
3,527,739 9/1970 Valvassori ......................... 260/80.78

Primary Examiner—Joseph L. Schofer
Assistant Examiner—Roger S. Benjamin
Attorney—Ralph M. Watson

[57] ABSTRACT

New, readily curable, amorphous terpolymers are disclosed which are prepared from ethylene, propylene and a polyene hydrocarbon which contains two double bonds and is represented by the formula:

$$A' - (C(R_o)_2)_n - (CH)_m B'$$

wherein $A'$ is a radical containing a ring having an endomethylene group; $B'$ is an alkadiene group; $R_o$ may be hydrogen, an aryl or an alkyl radical; $n$ is a whole number ranging from 0 to 3 and $m$ is either 0 and 1, $m$ being 0 if $n$ is different from 0, whereas $m$ may be both 0 and 1 if $n$ is 0.

13 Claims, No Drawings

CURABLE AMORPHOUS OLEFINIC TERPOLYMERS OBTAINED FROM ALPHA-OLEFINS AND POLYENES CONTAINING TWO CONJUGATED DOUBLE BONDS AND PROCESS FOR OBTAINING SAME

The present invention relates to new curable amorphous olefinic terpolymers obtained starting from alpha olefins and polyenes containing two conjugated double bonds and to the process for obtaining same.

Particularly the present invention refers to new terpolymers consisting of two alpha-olefins and a polyene hydrocarbon containing two conjugated double bonds having the following general formula:

$$A' - (C(R_o)_2)_n - (CH)_m B'$$

in which $A'$ is a radical consisting of a ring containing an endomethylene group; $B'$ may be both a linear alkadiene radical and a substituted and unsubstituted alkene or cycloalkene radical; $R_o$ may be hydrogen, an aryl or an alkyl radical; $n$ is a number ranging from 0 to 3; and $m$ a number selected between 0 and 1, $m$ being 0 if $n$ is different from 0, whereas $m$ may be both 0 and 1 if $n$ is 0.

In the above formula if n is different from O, $A'$ is a radical as:

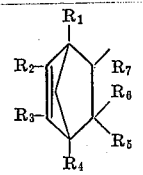

in which $R_1$, $R_2$, $R_3$, $R_4$, $R_5$, $R_6$ and $R_7$ usually are hydrogen, but may be alkyl, cycloalkyl or aryl radicals too; $B'$ is an alkadiene group containing two conjugated double bonds and selected from the following radicals:

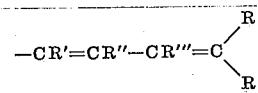

and

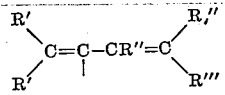

wherein R always is an alkyl radical; $R'$, $R''$ and $R'''$ may be hydrogen, alkyl or aryl radicals.

In the case $n$ is 0, $A'$ is a radical having the formula:

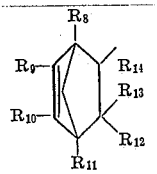

if $m$ is 1; if $m$ is 0, $A'$ is the following radical:

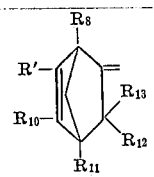

In both cases $R_8$, $R_9$, $R_{10}$, $R_{11}$, $R_{12}$, $R_{13}$ and $R_{14}$ usually are hydrogen, but may be also alkyl radicals having a number of carbon atoms ranging from 1 to 5; $B'$ is a radical selected from the following ones:

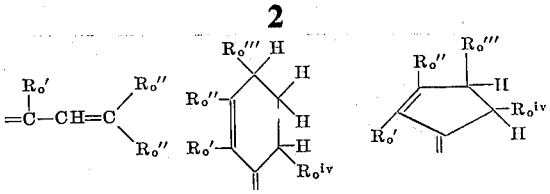

in which $R'_o$, $R''_o$, $R'''_o$ and $R_o^{iv}$ may be hydrogen or alkyl radicals having 1 to 5 carbon atoms.

Terpolymers are known which are formed from ethylene, propylene, or other olefins and diene compounds. It has, however, been observed that these terpolymers, while showing a high utilization of the diene monomer and a very good stability towards chemical agents, particularly towards chemical action of ozone and atmospheric agents, on account of their low degree of unsaturation, suffer from the disadvantage of having a rather low curing rate. Furthermore, the vulcanization reaction sometimes continues ad infinitum, i.e., without having a real end. This drawback adversely affects the properties of the terpolymer and considerably limits its use because, besides affecting the characteristics of the same polymer, it does not allow a satisfactory convulcanization with other usual elastomers having a high vulcanization rate.

We have now found that if polyenes of the type specified above are used as termonomers, the vulcanization rate of the resulting terpolymer is over 100 percent greater than that of a corresponding terpolymer containing traditional diene compounds.

The terpolymers, according to the present invention, can be obtained by any one of the known methods of polymerization. Examples of suitable alpha-olefins include ethylene, propylene, butenes, pentenes, methylpentenes, hexenes and the like. Preferably, use is made of the ethylene-propylene couple.

Examples of suitable termonomers include the following ones:

(I) 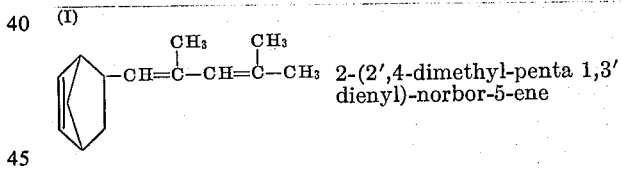 2-(2',4-dimethyl-penta 1,3' dienyl)-norbor-5-ene (II) 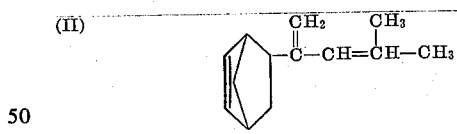

(III) 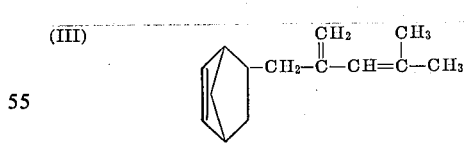

(IV) 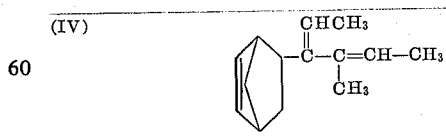

(V) 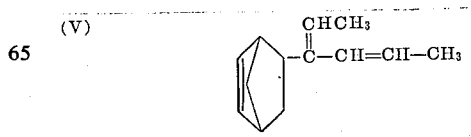

| | | |
|---|---|---|
| (VI) | 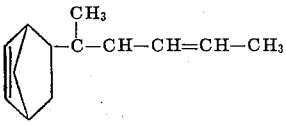 | 2-(1'-methyl-penta-1',3'-dienyl)-norbor-5-ene. |
| (VII) | 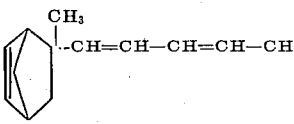 | 2-(penta-1',3'-dienyl)-2-methyl-norbor-5-ene. |
| (VIII) | 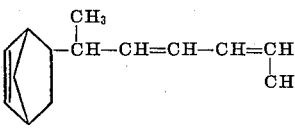 | 2-(1'-methyl-esa-2',4'-dienyl)-norbor-5-ene. |
| (IX) | 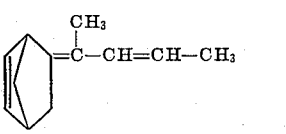 | 2-ethyliden-(1'-propenyl)-norbor-5-ene. |
| (X) | 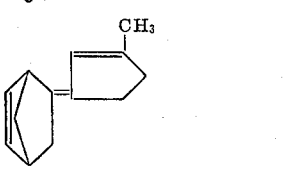 | 2-(3'methyl-cyclopent-2'-enyliden-1')-norbor-5-ene. |
| (XI) | 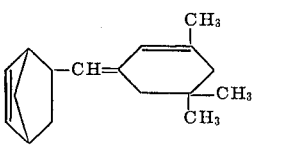 | 2-(norbor-5-ene)-1'-(3',5',5'-trimethyl-cycloes-2'-enyliden-1')methane. |
| (XII) | 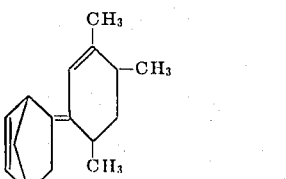 | 2-(3',4',6'-trimethylcycloes-2'-enyliden-1')-norbor-5-ene. |
| (XIII) | 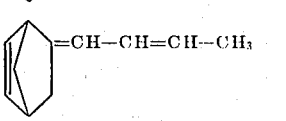 | 2-(but-2'-enyliden-1')-norbor-5-ene. |

Obviously it is possible to employ mixtures of the polyene compounds aforesaid instead of a single termonomer. The termonomers according to the present invention are easily obtainable at cheap prices. For example, it is possible to employ the methods of preparation described in U.S. Pat. No. 3,676,512.

According to another aspect of the present invention, there is provided a process for preparing the inventive terpolymers, which comprises polymerizing a mixture of the two different alpha-olefins and the polyene in the presence of a polymerization catalyst. An example of a suitable polymerizaton catalyst comprises a compound of a transition metal of Groups IV to VIII of the Periodic Table and a reducing aluminum compound having the general formula $AlYX_1X_2 \cdot n_1Z$ wherein Y is selected from hydrogen or hydrocarbon radicals having 1 to 10 carbon atoms; each of $X_1$ and $X_2$, which may be the same or different, is a hydrogen atom, a hydrocarbon radical having 1 to 10 carbon atoms, a halogen atom or a secondary amine radical; Z is a Lewis base and $n_1$ is 0, 1 or 2. Alternatively, the aluminum compound may be a polyiminoalane, as described in the Italian Pat. No. 778,353 of the same applicants.

The polymerization reaction can be carried out in the presence of an inert hydrocarbon solvent or in the same monomers (alpha-olefins) kept in the liquid state. The catalyst may be preformed in the presence or absence of one monomer or can be performed in "situ."

The temperatures are those usually employed in this type of reaction and may, for example, range from −60° to 100° C. Use is made of pressures between the pressure necessary to maintain at least partially the monomers in the liquid phase and 100 atmospheres, preferably from 1 to 80 atmospheres. In the case when the two alpha-olefins are ethylene and propylene, the preferred ratio between these two monomers ranges from 1 : 4 to 4 : 1, preferably from 1.5 : 1 to 1 : 3. Preferably, the polyene constitutes from 1 to 25 percent by weight of the terpolymer.

The present invention is now illustrated by the following unrestrictive examples. In the examples the course of the vulcanization reaction is studied by the torque registered by an oscillating plate vulcameter (rheometer Zwick type) during the vulcanization. The torque is proportional to the degree of vulcanization. It is assumed that the maximum variation of the torque is the difference between the torque measured after the first 250 minutes of vulcanization, and the torque initially measured, i.e., $G_{250} - G_{min} = G_{max}$; furthermore, it is assumed that the concentration of double bonds at a time $t$ is $G_{250} - G_t$, i.e., the difference between the assumed maximum and the torque at time $t$. The vulcanization rates, measured under the specified conditions, with a sulphur excess, depend substantially only on the concentration of double bonds.

The course of the vulcanization reaction satisfies a kinetic equation of the second order which may be expressed as follows:

$$dG_t/dt = K (G_{max} - G_t)^2$$

From this it is possible to evaluate the vulcanization rate constant $K$, once $G_{max}$ and $t_{90}$, which is the time required to obtain 90 percent of $G_{max} - G_{min}$, are known, using the following equation:

$$K = 1/G_{max} \cdot t_{90}$$

EXAMPLE 1

500 cc. of anhydrous n-heptane were introduced into an 800 cc. glass reactor under a nitrogen stream; the apparatus, equipped with an efficient stirrer, a loading funnel and a thermometer sheath, was put into a thermostatic bath at 0° C. and was kept at this temperature for the whole polymerization time.

Then a gaseous mixture of propylene and ethylene having a propylene/ethylene molar ratio of 2.5 and a flow rate of 600 N lt/h was blown in n-heptane for about 30 minutes. In order to facilitate the attainment of the saturation equilibrium the solvent was stirred and the gas mixture was forced to reach the bottom of the reactor which was suitably shaped in order to carry out a fast distribution of the gases into n-heptane. 2.4 mmoles/lt of $AlEt_2Cl$ were then introduced into the reactor, the solvent being energetically stirred; in a second time 2.7 cc. of a heptane solution of the compound I were introduced.

The terpolymerization reaction was started by introducing 0.4 mmoles/lt of $VAc_3$ (vanadium-triacetylacetonate); at the same time a gaseous stream of ethylene and propylene continued to be blown in the catalytic solution at the same starting composition and flow rate. 4 cc. of the aforesaid heptane solution were dropped every minute. The polymerization continued for 15 minutes; it was stopped by the addition to the reactor of a few ml. of n-butanol.

The final solution was washed by carrying out a suitable emulsion by adding 500 cc. of $H_2O$ to which 1 percent of surface-active agent (Drezinate) had been added; the emulsion was vigorously stirred for 30 minutes, then it was broken by the adding of 50 cc. of pure acetic acid. The watery phase was removed, and the polymer was still washed by 500 cc. of $H_2O$ containing 6 g. of the sodium salt of EDTA (ethylenediaminotetraacetic acid), while the pH was regulated at about 4.5 by adding acetic acid. The obtained mixture was powerfully stirred for 30 minutes, then twice washed by water. In such a way the inorganic residues were totally removed from the organic phase.

The terpolymer solution was coagulated by the addition of an excess of acetone; after drying, 17.5 g. of uncoloured elastomer were obtained, containing an amount of oxides (catalyst residuals) lower than 100 ppm. Upon X-ray examination the obtained polymer was completely amorphous and showed a $C_2$ content of 59 percent, while its intrinsic viscosity, measured in toluene at 30° C., was 1.3 dl/g. The U.V. examination of a terpolymer sample, purified by again and again dissolving and precipitating it, showed the presence of conjugated double bonds ($\lambda_{max} = 230$ m$\mu$); with reference to the pure termonomer, it was possible to calculate an amount of the compound I of 11.0 b.w. based on the observed absorption; the same amount was obtained by means of IBr absorption on a solution of terpolymer into a $CCl_4 + CHCl_3$ mixture (60 : 40).

A fraction of the terpolymer was subjected to curing at 145° C. in an oscillating plate Zwick rheometer having a twist angle $\alpha = 1.5$, using the following formulation:

| | parts |
|---|---|
| Polymer | 100 |
| HAF (carbon black) | 50 |
| $Z_nO$ | 5 |
| Circosol 4240 | 5 |
| MBT (mercaptobenzothiazole) | 0.5 |
| TMTD (tetramethyltiuramedisulphide) | 1 |
| sulphur | 2 |

The following results were obtained:
$t_i =$ (induction time) 30''
$t_{50} =$ (time required to obtain 50 percent of the maximum modulus) 4'30''
$t_{90} =$ (time required to obtain 90 percent of the maximum modulus) 23'
$K =$ (rate constant for the whole vulcanization reaction) 0.838 min$^{-m-n-1}$ kg$^{-1}$
$G_{max} =$ (maximum torque measured at the end of the vulcanization) 0.345 m kg
$G_{min} = 0.08$ m kg

EXAMPLE 2

The preceding example was repeated with the difference that the heptane solution added at every minute consisted of 1.65 cc. of the compound I and 48.5 cc. of n-heptane and the concentrations of the components of the catalyst system were the following ones: Al $Et_2Cl$ = 1.8 mmoles/lt, and $VAc_3 = 0.3$ mmoles/lt. After 17' of terpolymerization 19.5 g. were obtained having a termonomer content equal to 6.0 percent b.w. This sample showed and intrinsic viscosity [$\eta$] = 2.86 dl/g., determined in toluene, and a $C_2$ content equal to 59 percent.

The technological data were the following ones:
$K = 0.388$ min$^{-1}$ m$^{-1}$ kg$^{-1}$
$t_i = 3'20''$
$t_{90} = 28'$
$G_{max} = 0.435$ m kg By way of comparison a terpolymer sample was prepared containing dicyclopentadiene under the same conditions as those described above; the sample showed [$\eta$] = 2.60 dl/g and a dicyclopentadiene content of 6.5 percent. After vulcanization under the same aforesaid conditions, the following results were obtained:
$K = 0.128$ min$^{-1}$ m$^{-1}$ kg$^{-1}$
$t_i = 5'$
$t_{90} = 101'30''$
$G_{max} = 0.488$ m kg These results emphasize the higher vulcanization rate of the terpolymers comprising compounds of type I.

EXAMPLE 3

The working conditions were the ones of the preceding example with the difference that the heptane solution of the termonomer container 3.5 cc. of the compound II dissolved into 46.5 cc. of heptane, and the concentrations of AlEt$_2$Cl and VCl$_4$ were 2.4 mmoles/1t and 0.4 mmoles/1y. At −20° C. of 15.1 of terpolymer were obtained after 15', having a termonomer content equal to 11.8 percent b.w. The U.V. examination too confirmed the above unsaturation amount; the spectrum emphasized the nature of the conjugated double bonds of the macromolecules. This sample showed a toluene [$\eta$] equal to 3.10 dl/g and a C$_2$ content of 58 percent.

The technological data were the following ones:

$K = 1.145$ m$^{-1}$ min$^{-1}$ kg$^{-1}$
$t_i = 3'40''$
$t_{50} = 4'30''$
$t_{90} = 22'$

EXAMPLE 4

The preceding example was repeated with the only difference that the termonomer employed was the compound IV. After 10' of polymerization 9.8 g. of elastomer were obtained showing [$\eta$] = 3.50 dl/g, a C$_2$H$_4$ content equal to 60 percent b.w. and a termonomer content of 9.2 percent b.w. measured by IBr absorption. At the U.V. examination, hexane solutions of the terpolymer showed the typical absorption of the conjugated double bonds of the compound IV.

EXAMPLE 5

500 cc. of anhydrous n-heptane was introduced into an 800 cc. glass reactor under a nitrogen stream; the apparatus, equipped with an efficient stirrer, a loading funnel and a thermometer sheath, was put into a thermostatic bath at 0° C. and was kept at this temperature for the whole polymerization time. Then a gaseous mixture of propylene and ethylene having a propylene-/ethylene molar ratio of 2.5 and a flow rate of 600 N 1t/h was blown in n-heptane for about 30 minutes. In order to facilitate the attainment of the saturation equilibrium the solvent was stirred and the gas mixture was forced to reach the bottom of the reactor which was suitably shaped in order to carry out a fast distribution of the gases into n-heptane. 2.8 mmoles/1t of AlEt$_2$Cl were introduced into the reactor, the solvent being energetically stirred; in a second time 2.7 cc. of a heptane solution of the compound IX were introduced (20 cc. of IX into 50 cc. of n-heptane.

The terpolymerization reaction was started by introducing 0.4 mmoles/1t of VAc$_3$ (vanadium-triacetylacetonate); at the same time a gaseous stream of ethylene and propylene continued to be blown in the catalytic solution at the same starting composition and flow rate. 4 cc. of the aforesaid heptane solution were dropped every minute. The polymerization continued for 15 minutes; it was stopped by the addition to the reactor of a few ml. of n-butanol.

The final solution was washed by forming a suitable emulsion by adding 500 cc. of H$_2$O to which 1 percent of surface-active agent (Drezinate) had been added; the emulsion was vigorously stirred for 30 minutes, then it was broken by the addition of 50 cc. of pure acetic acid. The watery phase was removed, and the polymer solution was still washed by 500 cc. of H$_2$O containing 6 g. of the sodium salt EDTA (ethylenediaminotetracetic acid) while the pH was regulated at about 4.5 by adding acetic acid.

The obtained mixture was powerfully stirred for 30 minutes, then twice washed by water. In such a way the inorganic residues were totally removed from the organic phase. The terpolymer solution was coagulated by the addition of an excess of acetone; after drying, 22.3 g. of amorphous elastomer were obtained, containing a C$_2$ content of 60 percent b.w., a IX content equal to 6.3 percent, and having an intrinsic viscosity [$\eta$] = 2.24 dl/g.

EXAMPLE 6

According to the preceding example, at 0° C. a catalyst was employed consisting of 0.8 mmoles/1t of VAc$_3$ and 5.6 mmoles/1t of AlEt$_2$Cl. Moreover 3 cc. of the compound XI were used; 1 cc. was at once added, whereas the remaining 2 cc. were added for the whole reaction time. After 12 minutes, 17.5 g. of elastomer were obtained having [$\eta$] = 2.90 dl/g, a C$_2$H$_4$ content of 59 percent b.w. and 12.1 percent of IX, measured by IBr titration. A fraction of the terpolymer was subjected to curing at 145° C. in an oscillating plate Zwick rheometer having a twist angle $\alpha = 1.5°$, using the following formulation:

| | parts |
|---|---|
| Polymer | 100 |
| HAF | 50 |
| Z$_n$O | 5 |
| Circosol 4240 | 5 |
| MBT | 0.5 |
| TMTD | 1 |
| Sulphur | 2 |

The following results were obtained:
$t_i=2'50''$   $t_{50}=2'50''$
$t_{90}=16'40''$
$G_{max}=0.320$ m kg
$K=1.74$ m$^{-1}$ kg$^{-1}$ min$^{-1}$

EXAMPLE 7

The preceding example was repeated with the difference that the termonomer X was employed and the reaction was continued for 10 minutes. 19.7 g. of elastic polymer were obtained, having the shape of cured rubber and showing conjugated double bonds at U.V. examination. The intrinsic viscosity was 3.28 dl/g and the C$_2$ content was equal to 63 percent b.w.

What we claim is:

1. Curable amorphous olefinic terpolymers having a very high curing rate and consisting of ethylene, and an alpha-olefin having 3 to 10 carbon atoms in a ratio of from 1:4 to 4:1 and from 1 to 25 percent b.w. of a polyene hydrocarbon containing two conjugated double bonds according to the following general formula:

$$[A' - (C(R_o)_2)_n - (CH)_m = B']$$
$$A' - (C(R_o)_2)_n - (CH)_m B'$$

wherein R$_o$ may be hydrogen, an aryl or an alkyl radical; $n$ is a whole number ranging from 0 to 3 and $m$ is either 0 and 1, $m$ being 0 if $n$ is different from 0, whereas $m$ may be both 0 and 1 if $n$ is 0; when $n$ is different from 0, A' is

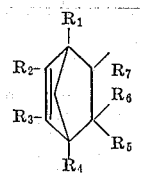

wherein R$_1$, R$_2$, R$_3$, R$_4$, R$_5$, R$_6$ and R$_7$ may be hydrogen, alkyl, cycloalkyl or aryl; and B' is an alkadiene group containing two conjugated double bonds and selected from the following radicals:

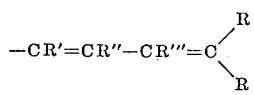

and

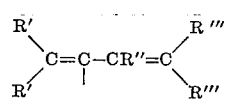

wherein R is always an alkyl radical; R', R'' and R''' may be hydrogen, alkyl or aryl radicals;

when $n$ is 0 and $m$ is 1, A' is a radical having the formula:

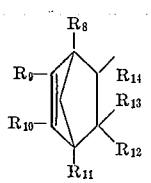

and when $n$ is 0 and $m$ is 0, A' is a radical having the formula:

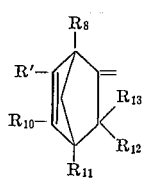

wherein $R_8$, $R_9$, $R_{10}$, $R_{11}$, $R_{12}$, $R_{13}$ and $R_{14}$ are hydrogen or alkyl radicals having 1 to 5 carbon atoms and B' is a radical selected from the group consisting of

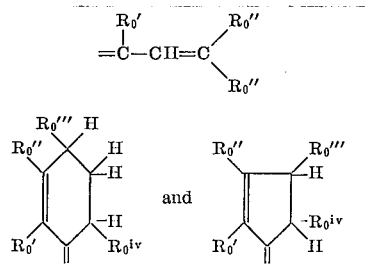

in which $R'_o$, $R''_o$, $R'''_o$ and $R_o^{iv}$ may be hydrogen or alkyl radicals having 1 to 5 carbon atoms.

2. Terpolymers as claimed in claim 1 characterized in that the termonomer consists of a mixture of the aforesaid polyene compounds.

3. Terpolymers as claimed in claim 1 characterized in that the alpha-olefin is preferably selected from propylene, butenes, pentenes, methylpentenes and hexenes.

4. Terpolymers as claimed in claim 1 in that the alpha-olefin is propylene.

5. Curable amorphous olefinic terpolymers as claimed in claim 1 characterized in that the polyenes amount in the elastomer ranges from 1 percent to 25 percent b.w.

6. Terpolymers as claimed in claim 1 characterized in that the ratio between ethylene and propylene is from 1.5 : 1 to 1 : 3.

7. Elastomers obtained by curing the terpolymers as claimed in claim 1.

8. A process for preparing a terpolymer as claimed in claim 1 which comprises polymerizing a mixture of the two different alpha-olefins and the polyene in the presence of a catalyst system comprising:
A. A compound of vanadium;
B. A reducing aluminum compound having the formula:

$$AlYX_1X_2 \cdot n_1Z$$

wherein Y is selected from hydrogen or hydrocarbon radicals having 1 to 10 carbon atoms; each of $X_1$ and $X_2$, which may be the same or different, is a hydrogen atom, a hydrocarbon radical having 1 to 10 carbon atoms, a halogen atom or a secondary amine radical; Z is a Lewis base and $n_1$ is 0, 1 or 2.

9. A process as claimed in claim 8 characterized in that the reducing aluminum compound is a polyiminoalane.

10. A process as claimed in claim 8 characterized in that the polymerization reaction is carried out at a temperature of from $-60$ to $+100°$ C and a pressure of from 1 to 80 atmospheres.

11. A process as claimed in claim 8 characterized in that the polymerization reaction is carried out in the presence of an inert hydrocarbon solvent.

12. A process as claimed in claim 11 characterized in that the inert solvent is n-heptane.

13. A process as claimed in claim 8 characterized in that the polymerization reaction is carried out in the absence of solvents, the monomer being the reaction medium.

* * * * *